(12) United States Patent
Kim et al.

(10) Patent No.: US 11,140,753 B2
(45) Date of Patent: Oct. 5, 2021

(54) INDUCTION HEATING DEVICE HAVING IMPROVED COMPONENT ARRANGEMENT STRUCTURE AND ASSEMBLABILITY

(71) Applicant: LG Electronics Inc., Seoul (KR)

(72) Inventors: Seongjun Kim, Seoul (KR); Seongho Son, Seoul (KR); Yongsoo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 139 days.

(21) Appl. No.: 16/687,935

(22) Filed: Nov. 19, 2019

(65) Prior Publication Data

US 2020/0163170 A1     May 21, 2020

(30) Foreign Application Priority Data

Nov. 19, 2018    (KR) .................. 10-2018-0143014

(51) Int. Cl.
*H05B 6/12*      (2006.01)
*F21V 8/00*      (2006.01)

(52) U.S. Cl.
CPC ......... *H05B 6/1218* (2013.01); *G02B 6/0088* (2013.01); *G02B 6/0091* (2013.01)

(58) Field of Classification Search
CPC ... H05B 6/1218; G02B 6/0088; G02B 6/0091
See application file for complete search history.

(56) References Cited

U.S. PATENT DOCUMENTS

2018/0347823 A1    12/2018   Camanes Vera et al.
2019/0281668 A1*   9/2019   Kim ...................... H05B 6/36
2019/0297685 A1*   9/2019   An ........................ H05B 6/1263
2019/0297687 A1*   9/2019   Kim ...................... H05B 6/365
2019/0306928 A1*   10/2019   Choi ................... H05B 6/1272
2020/0120761 A1*   4/2020   Ok ......................... H05B 6/062

(Continued)

FOREIGN PATENT DOCUMENTS

DE     112013004163     5/2015
DE     112013003978     6/2015

(Continued)

OTHER PUBLICATIONS

Extended European Search Report in European Appln. No. 19208418.4, dated Apr. 15, 2020, 5 pages.

*Primary Examiner* — Mary Ellen Bowman
(74) *Attorney, Agent, or Firm* — Fish & Richardson P.C.

(57) ABSTRACT

An induction heating device includes: a case; working coils; a base plate that supports the working coils; light guides that are installed on the base plate and that cover outer portions of each working coil; light emitting elements disposed below the light guides and configured to emit light; and an indicator substrate that is disposed below the base plate and that seats the light emitting elements. The indicator substrate includes a first indicator substrate, where a first portion of the light emitting elements are arranged along outer portions of the first indicator substrate, and a second indicator substrate disposed at a rear side of the first indicator substrate, where a second portion of the light emitting elements are arranged along outer portions of the second indicator substrate except for an outer portion at a front side that is adjacent to and faces the rear side of the first indicator substrate.

20 Claims, 15 Drawing Sheets

(56) References Cited

U.S. PATENT DOCUMENTS

| | | | | |
|---|---|---|---|---|
| 2020/0154532 A1* | 5/2020 | Kim | ............... | H05B 6/365 |
| 2020/0154598 A1* | 5/2020 | Kim | ............... | H05K 7/207 |
| 2020/0337121 A1* | 10/2020 | Lee | ............... | G06F 3/04883 |
| 2020/0359469 A1* | 11/2020 | Kim | ............... | H05B 6/1209 |

FOREIGN PATENT DOCUMENTS

| | | |
|---|---|---|
| JP | 6052585 | 12/2016 |
| JP | 2017059460 | 3/2017 |
| WO | 2017093850 | 6/2017 |

* cited by examiner

INDUCTION HEATING DEVICE HAVING IMPROVED COMPONENT ARRANGEMENT STRUCTURE AND ASSEMBLABILITY

CROSS-REFERENCE TO RELATED APPLICATION

The present disclosure claims priority to and the benefit of Korean Patent Application No. 10-2018-0143014, filed on Nov. 19, 2018, the disclosure of which is incorporated herein by reference in its entirety.

TECHNICAL FIELD

An induction heating device having an improved structure in which components are arranged and assemblability is disclosed herein.

BACKGROUND

Various types of cooking apparatus may be used to heat food in homes and restaurants. For example, gas ranges use gas as fuel to heat food. In some examples, cooking devices that may heat an object such as a cooking vessel, for example, a pot, with electricity instead of gas.

A method of heating an object via electricity may be classified into a resistive heating method and an induction heating method. In the electrical resistive method, heat may be generated based on current flowing through a metal resistance wire or a non-metallic heating element, such as silicon carbide, and the heat may be transmitted to the object (e.g., the cooking vessel) through radiation or conduction, to heat the object. In the induction heating method, eddy current may be generated in the object made of metal based on a magnetic field generated around the coil based on a high-frequency power having a predetermined magnitude applied to the coil to heat the object.

The induction heating devices use an induction heating method and may include working coils respectively in corresponding regions to heat each of a plurality of objects (e.g., cooking vessels).

In some cases, an induction heating device (i.e., a zone-free type induction heating device) may simultaneously heat one object with a plurality of working coils.

In some cases, a zone-free type induction heating device may inductively heat an object regardless of a size and a position of the object in a region in which a plurality of working coils are present. In some cases, a flex or dual-type induction heating device may include an indicator that includes a light emitting element and a light guide and that indicates whether the working coil is driven or the output intensity. A structure of the indicator of the induction heating device in related art is described with reference to FIGS. 1 to 3.

FIGS. 1 to 3 are schematic views showing examples of indicators of induction heating devices in related art.

As shown in FIGS. 1 to 3, in the induction heating device in related art, a plurality of working coils 2 are arranged side by side in a matrix, and the indicator may include a light guide 25 that surrounds the working coil 2 and a light emitting display 23 installed between the light guides 25 to emit a light.

Specifically, in the induction heating device in related art, a light emitting element 8 may be installed in a light emitting display case 24 that surrounds the working coil 2, and the light emitting display case 24 in which the light emitting element 8 is installed may contact a spring 11. Further, the light guide 25 may contact the working coil 2, and the light emitting element 8 may be placed at a side of the light guide 26.

In some cases, light emitting components (e.g., the light emitting element 8, the light emitting display 23, and the like) may be separated from light guide components (e.g., the light guide 26 and the light guide support 27). In some cases, a plurality of components such as light emitting components and light guide components may be required.

In some cases, where an individual indicator substrate is used per one working coil, a number of components and harness for the connection between the substrates may be increased, and a number of people for working of the induction heating device and material costs of the induction heating device may be increased.

In some cases, where an integrated indicator substrate that covers the entire working coil is used, an assemblability (i.e., ease of manufacturing) of the induction heating device may be deteriorated, and some of the indicator substrates may be discarded due to the input interface provided at a central region of the product.

SUMMARY

The present disclosure describes an induction heating device having an improved structure in which light emitting elements are arranged.

The present disclosure also describes an induction heating device having an improved structure to fix the indicator substrate.

The objects of the present disclosure are not limited to the above-mentioned objects, and other objects and advantages of the present disclosure which are not mentioned may be understood by the following description and more clearly understood by the implementations of the present disclosure. It will also be readily apparent that the objects and advantages of the present disclosure may be implemented by means defined in claims and a combination thereof.

According to one aspect of the subject matter described in this application, an induction heating device includes: a case; a plurality of working coils located inside the case and configured to heat one or more objects; a base plate that supports the plurality of working coils; a plurality of light guides that are installed on the base plate and that define four surfaces that cover outer portions of each of the plurality of working coils; a plurality of light emitting elements disposed vertically below the plurality of light guides, respectively, and configured to emit light; and an indicator substrate that is disposed vertically below the base plate and that seats the plurality of light emitting elements. The indicator substrate includes: a first indicator substrate, where a first portion of the plurality of light emitting elements are arranged along outer portions of the first indicator substrate; and a second indicator substrate disposed at a rear side of the first indicator substrate, where a second portion of the plurality of light emitting elements are arranged along outer portions of the second indicator substrate except for an outer portion at a front side that is adjacent to and faces the rear side of the first indicator substrate.

Implementations according to this aspect may include one or more of the following features. For example, wherein the plurality of working coils may include: a first working coil portion including first two or more working coils that are connected to each other and disposed vertically above the first indicator substrate; and a second working coil portion including second two or more working coils that are connected to each other and disposed vertically above the second indicator substrate. The second working coil portion may be disposed at a rear side of the first working coil portion.

In some examples, the outer portion at the front side of the second indicator substrate may vertically overlap with a front end of the second working coil portion. In some examples, the first portion of the plurality of light emitting elements may be installed at a portion of the first indicator substrate that vertically overlaps with four surfaces of the outer portions of the first indicator substrate around the first two or more working coils. The second portion of the plurality of light emitting elements may be installed at a portion of the second indicator substrate that vertically overlaps with three surfaces among four surfaces of the outer portions of the second indicator substrate around the second two or more working coils except for a front end of the second working coil portion.

In some implementations, the indicator substrate may further include: a third indicator substrate installed at a lateral side of the first indicator substrate, where a third portion of the plurality of light emitting elements are arranged along outer portions of the third indicator substrate except for an outer portion that is adjacent to and faces the first indicator substrate; and a fourth indicator substrate installed at a lateral side of the third indicator substrate, where a fourth portion of the plurality of light emitting elements are arranged along outer portions of the fourth indicator substrate except for an outer portion that is adjacent to and faces the third indicator substrate. The plurality of working coils may further include: a third working coil portion including third two or more working coils that are connected to each other, that are disposed side by side, and that are disposed vertically above the third indicator substrate, where one of the third two or more working coils faces at a lateral side of one of the first two or more working coils; and a fourth working coil portion including fourth two or more working coils that are connected to each other, that are disposed side by side, and that are disposed vertically above the fourth indicator substrate, where one of the fourth two or more working coils faces a lateral side of one of the third two or more working coils.

In some examples, the outer portion of the third indicator substrate may vertically overlap with the one of the third two or more working coils, and the outer portion of the fourth indicator substrate may vertically overlap with the one of the fourth two or more working coils. In some examples, the third portion of the plurality of light emitting elements may be installed at a portion of the third indicator substrate that vertically overlaps with three sides among four sides around the third two or more working coils except for one side facing the lateral side of the one of the first two or more working coils. The fourth portion of the plurality of light emitting elements may be installed at a portion of the fourth indicator substrate that vertically overlaps with three sides among four sides around the fourth two or more working coils except for one side facing the lateral side of the one of the third two or more working coils.

In some implementations, the first working coil portion may further include four working coils arranged parallel to the first two or more working coils, and the second working coil portion may further include two working coils connected arranged parallel to the second two or more working coils. The third working coil portion may further include four working coils arranged parallel to the third two or more working coils, and the fourth working coil portion may further include four working coils arranged parallel to the fourth two or more working coils.

In some implementations, the induction heating device may further include an indicator substrate support, where an upper surface of the indicator substrate support defines a first upper surface area that supports the first indicator substrate and a second upper surface area that supports the second indicator substrate. The indicator substrate may further include a third indicator substrate installed on a third upper surface area of the upper surface of the indicator substrate support and disposed at one side of the first indicator substrate, where a third portion of the plurality of light emitting elements are arranged along outer portions of the third indicator substrate except for an outer portion that is adjacent to and faces the first indicator substrate.

In some implementations, the induction heating device may further include: a first fixing boss that is disposed at a first outer portion of the first upper surface area and that protrudes upward of the first upper surface area, where the first indicator substrate defines a first boss groove that is disposed at a first side of the first indicator substrate, that vertically overlaps with the first fixing boss, that surrounds at least a portion of the first fixing boss; a second fixing boss that is disposed at a second outer portion of the first upper surface area and that protrudes upward of the first upper surface area, where the first indicator substrate further defines a second boss groove that is disposed at a second side of the first indicator substrate, that vertically overlaps with the second fixing boss, and that surrounds at least a portion of the second fixing boss. The induction heating device may further include: a first screw that is disposed in the first upper surface area, that is spaced apart from the first fixing boss by a first distance in a rearward direction, and that is fastened to the first upper surface area through the first indicator substrate; and a first interference fitting portion that is disposed in the first upper surface area, that is spaced apart from the second fixing boss by a second distance in the rearward direction, and that is configured to fix the first indicator substrate to the first upper surface area.

In some implementations, the induction heating device may further include: a second interference fitting portion that is disposed at a front end of the second upper surface area and coupled to the second indicator substrate; a third fixing boss that is disposed at a rear end of the second upper surface area and that protrudes upward of the second upper surface area, where the second indicator substrate defines a third boss groove that is disposed at a rear end of the second indicator substrate, that vertically overlaps with the third fixing boss, and that surrounds at least a portion of the third fixing boss; and a second screw that is disposed in the second upper surface area, that is spaced apart from the third fixing boss by a third distance in a lateral direction, and that is fastened to the second upper surface area through the second indicator substrate.

In some implementations, the induction heating device may further include: a fourth fixing boss that is disposed at an outer portion of the third upper surface area and that protrudes upward of the third upper surface area, where the third indicator substrate defines a fourth boss groove that is disposed at an outer portion of the third indicator substrate, that vertically overlaps with the fourth fixing boss, and that surrounds at least a portion of the fourth fixing boss; a third interference fitting portion that is disposed in the third upper surface area, that is spaced apart from the fourth fixing boss by a fourth distance in the rearward direction, and that is configured to fix the third indicator substrate to the third upper surface area; and a third screw that is disposed in the third upper surface area, that is spaced apart from the third interference fitting portion by a fifth distance in the lateral direction, and that is fastened to the third upper surface area through the third indicator substrate.

In some implementations, the induction heating device may further include: a plurality of supporting bosses that protrude upward of the upper surface of the indicator substrate support and that support each of the first indicator substrate, the second indicator substrate, and the third indicator substrate.

In some implementations, the induction heating device may further include: a cover plate that is coupled to an upper end of the case, the cover plate including a top plate configured to seat the one or more objects; and an input interface that is flush with the top plate and that is configured to display one or more images. In some examples, the input interface may be disposed at one side of the second indicator substrate in an oblique position with respect to the first indicator substrate.

In some implementations, a number of the first portion of the plurality of working coils may be greater than a number of the second portion of the plurality of working coils. In some implementations, a number of the first portion of the plurality of working coils is greater than a number of the second portion of the plurality of working coils, and the number of the first portion of the plurality of working coils is equal to a number of the third portion of the plurality of working coils.

In some implementations, the induction heating device may further include: a cover plate that is coupled to an upper end of the case, the cover plate including a top plate configured to seat the one or more objects; and an input interface that is flush with the top plate and that is configured to display one or more images. The input interface may be located at an oblique position with respect to the first indicator substrate, and faces a lateral side of the second indicator substrate and a rear side of the third indicator substrate.

In some implementations, the fourth indicator substrate may be disposed at a position symmetrical to the third indicator substrate with respect to a lateral side of the third indicator substrate, and the indicator substrate may further include additional indicator substrates that are respectively disposed at positions symmetrical to the first indicator substrate and the second indicator substrate with respect to the lateral side of the third indicator substrate.

In some implementations, the induction heating device may further include: a cover plate that is coupled to an upper end of the case, the cover plate including a top plate configured to seat the one or more objects; and an input interface that is flush with the top plate and that is configured to display one or more images. The input interface may have three sides that are surround by the first indicator substrate, the second indicator substrate, the third indicator substrate, the fourth indicator substrate, and the additional indicator substrates.

In some implementations, arrangement of the light emitting elements may be improved so that the light emitting elements may be provided onto four surfaces at the outer portions of the working coils by a predetermined distance, and unnecessary light emitting elements may be reduced. Further, material costs may be reduced and a space may be provided by reducing the unnecessary light emitting elements, thereby improving ease of manufacturing of the indicator substrate and increasing strength of the indicator substrate support.

In some implementations, the structure to fix the indicator substrate may be improved so that the number of screws required to fix the indicator substrate may be reduced.

Further, a time taken to fasten screws may be less and assemblability may be improved by reducing the number of screws.

Hereafter, a specific effect of the present disclosure, further to the above-mentioned effect, is described together while describing a specific matter for implementing the present disclosure.

DETAILED DESCRIPTION

Figure 1:
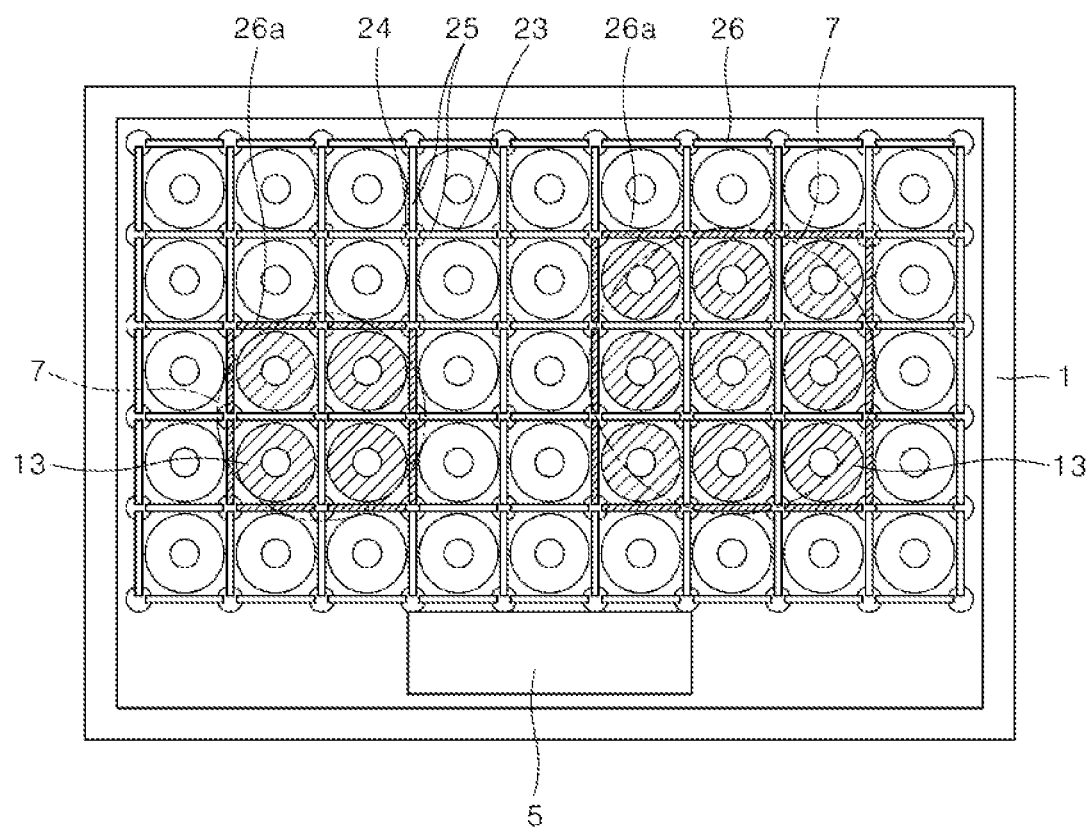
FIGS. 1 to 3 are schematic views showing examples of indicators of induction heating devices in related art.
Figure 2:
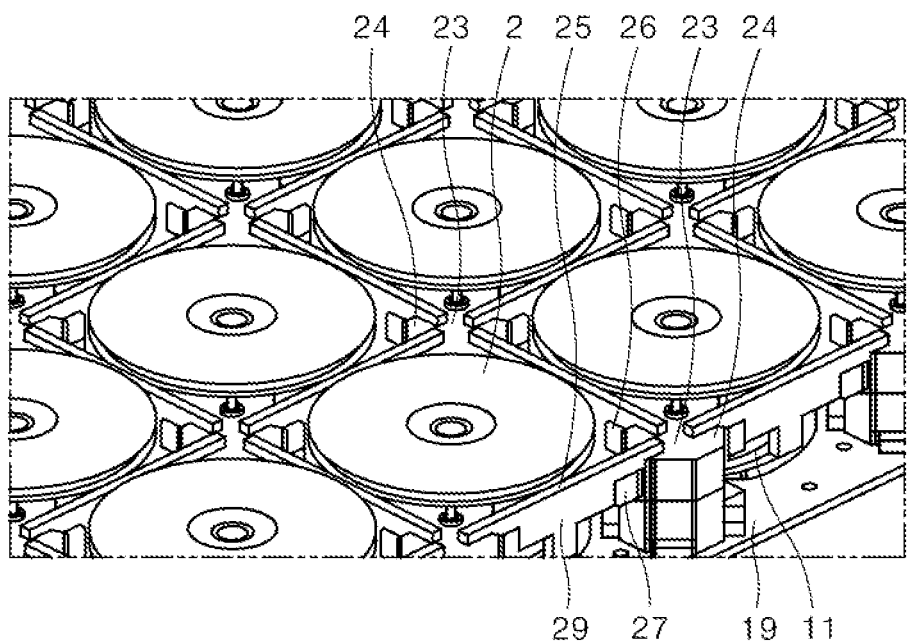
Figure 3:
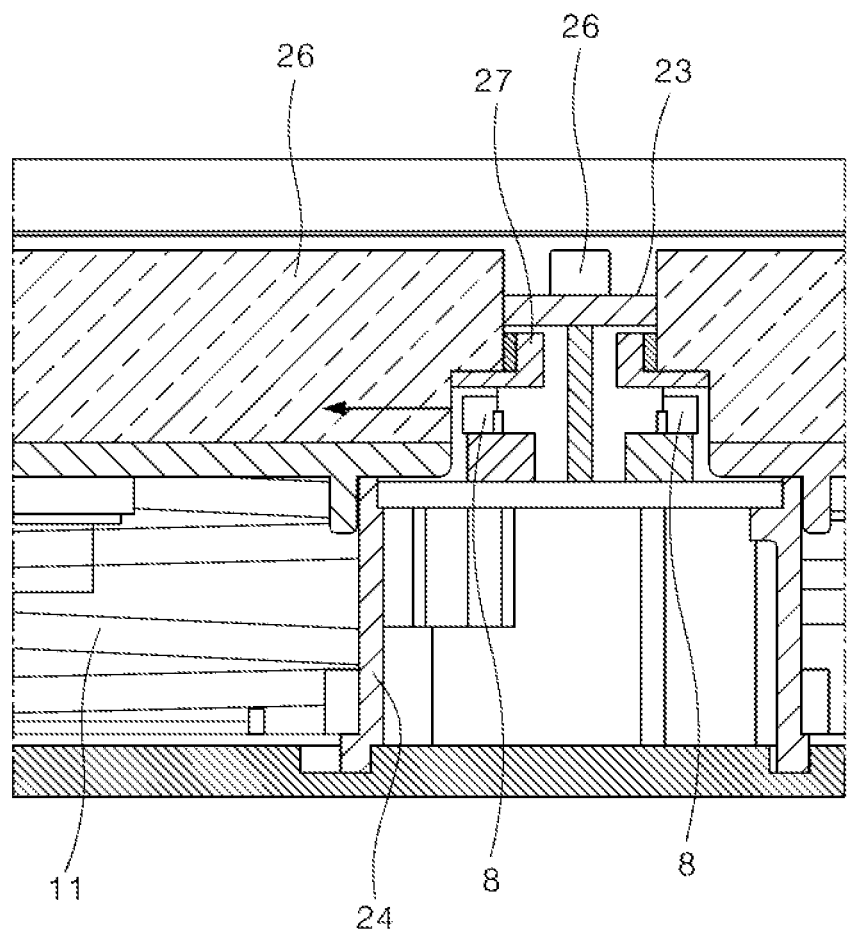

The above mentioned objects, features, and advantages of the present disclosure are described in detail with reference to the accompanying drawings, so that those skilled in the art to which the present disclosure pertains may easily implement the technical idea of the present disclosure. In the description of the present disclosure, when it is determined that the detailed description of the known technology related to the present disclosure may obscure the gist of the present disclosure, the detailed description thereof is omitted. Hereinafter, one or more implementations of the present disclosure are described in detail with reference to the accompanying drawings. A same reference numeral in the drawings is used to indicate same or similar components.

Hereinafter, according to an implementation of the present disclosure, an induction heating device is described.

Figure 4:
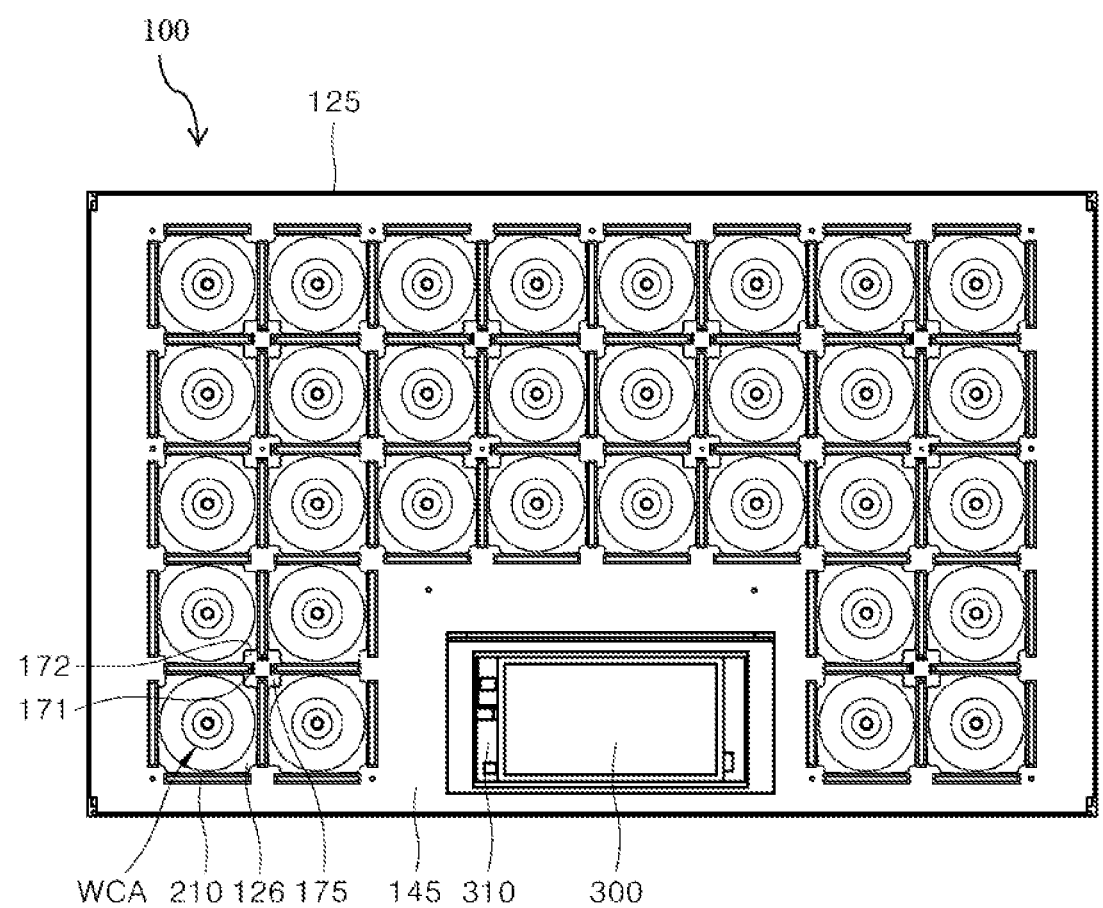
FIG. 4 is a plan view showing an example of an induction heating device according to the present disclosure.
Figure 5:
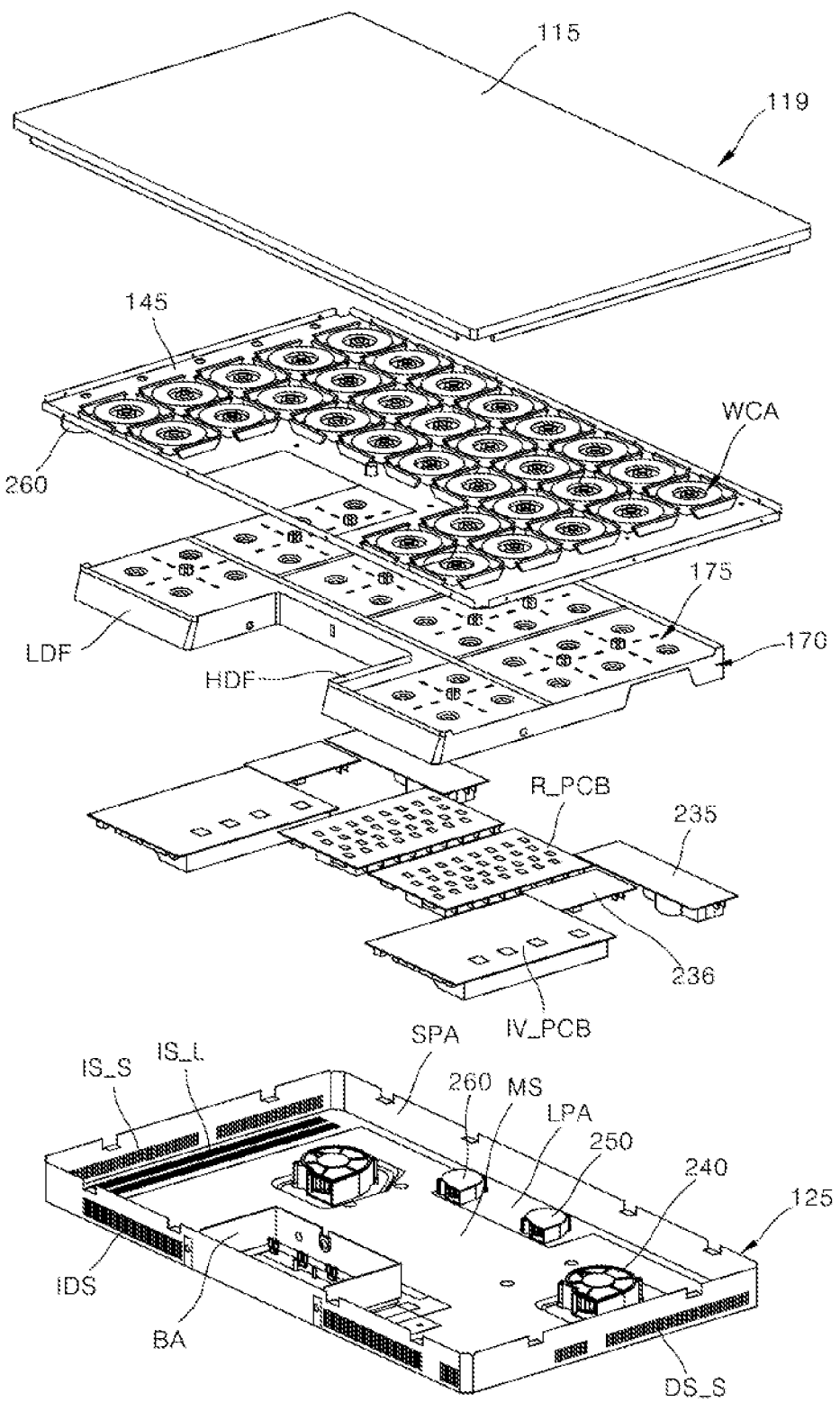
FIG. 5 is an exploded perspective view showing the induction heating device in FIG. 4.
Figure 6:
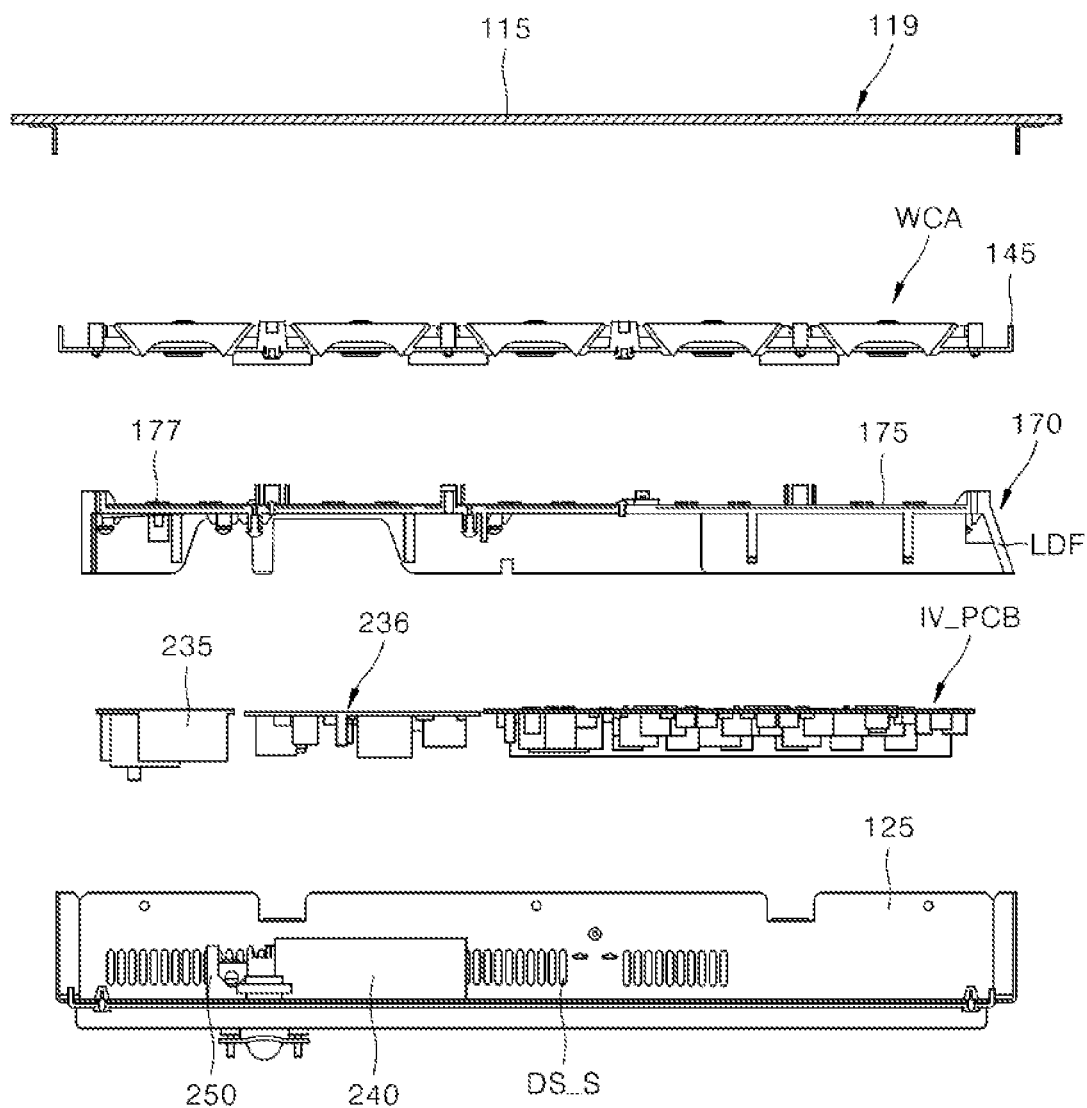
FIG. 6 is a cross-sectional view showing the induction heating device in FIG. 5.
Figure 7:
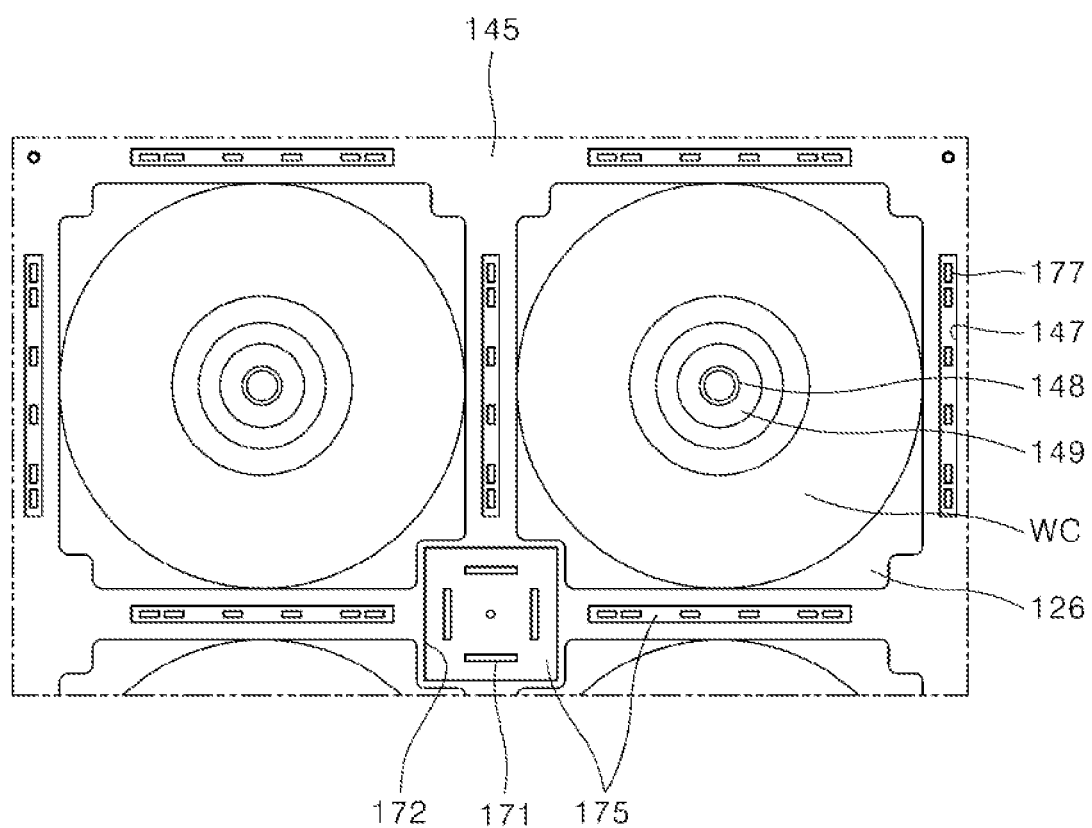
FIGS. 7 and 8 are partially enlarged views showing the induction heating device in FIG. 4.
Figure 8:
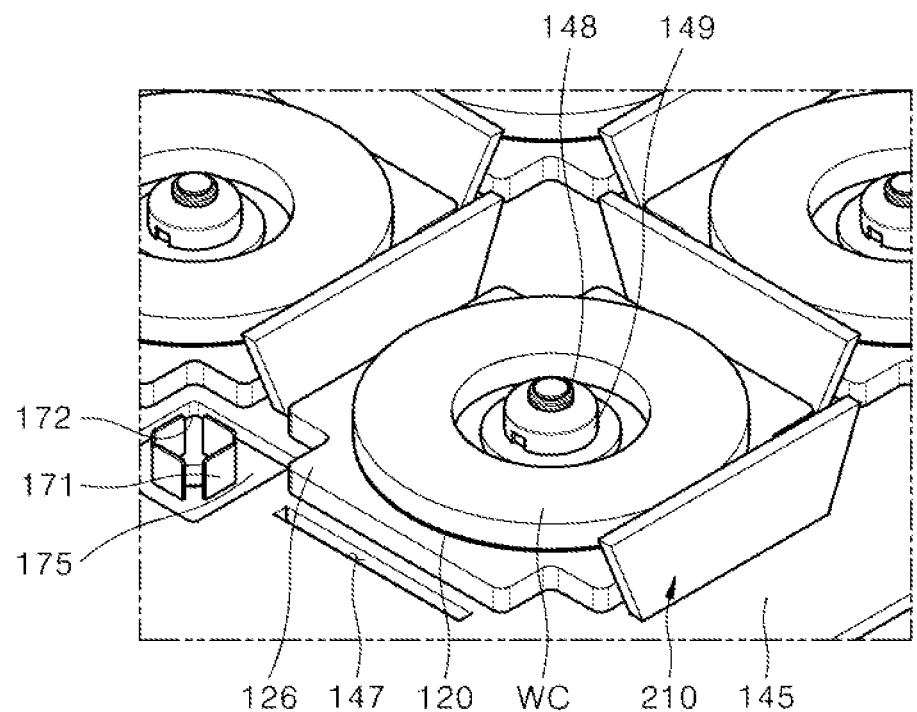

FIG. 4 illustrates an example of an induction heating device according to an implementation of the present disclosure. FIG. 5 illustrates the induction heating device in FIG. 4. FIG. 6 illustrates the induction heating device in FIG. 5. FIGS. 7 and 8 illustrate the induction heating device in FIG. 4.

For convenience of explanation, the cover plate is omitted from FIGS. 4, 7, and 8. For convenience of explanation, a light guide is omitted from FIG. 7.

Referring to FIGS. 4 to 8, an induction heating device 100 may include a case 125, a cover plate 119, a base plate 145, and an indicator substrate support 170, an indicator substrate 175, a light emitting element 177, a light guide 210, an electro-magnetic interference (EMI) filter 235, a switched mode power supply (SMPS) 236, a first blowing fan 240, a second blowing fan 250, a third blowing fan 260, an input interface 300, and a controller 310 for the input interface 300, a working coil assembly WCA, a resonance substrate R_PCB, and an inverter substrate IV_PCB.

The case 125 may include various types of components included in the induction heating device 100, for example, a working coil assembly WCA, a base plate 145, an indicator substrate support 170, an indicator substrate 175, a light emitting element 177, a light guide 210, an electro-magnetic interference (EMI) filter 235, a SMPS 236, a first blowing fan 240, a second blowing fan 250, a third blowing fan 260, a controller 310 for the input interface 300, a working coil assembly WCA, a resonance substrate R_PCB, and an inverter substrate IV_PCB.

Further, the case 125 may include various types of devices related to the driving of the working coil WC (e.g., a power supply that provides an alternating current (AC) power (i.e., input power), a controller for an inverter substrate that controls the driving of components of the inverter substrate IV_PCB, a relay or a semiconductor switch that turns on or turns off the working coil WC, but details of various types of devices related to the driving of the working coil WC are omitted.

Further, the case 125 may be thermally insulated to prevent heat generated by the working coil WC from being leaking to the outside.

Further, the case 125 may include a lower plate LPA and a side plate SPA that extends upward along an edge of the lower plate LPA.

Inlets and exhaust slits (now shown) may be defined at a portion of an area of the lower plate LPA. Further, inlet slits IS_S and IS_L and an additional exhaust slit DS_S, may be defined in a remaining area of the lower plate LPA and the side plate SPA. Details of the inlet, inlet slit, and the exhaust slit are described below in detail.

In some implementations, an inlet and exhaust slit IDS may also be defined on the side plate SPA, and air may move to an inside of and to an outside of the case 125 through the inlet and exhaust slit IDS.

Further, a barrier BA may be installed at a periphery of an area, on the lower plate LPA of the case 125, where the controller 310 for the input interface 300 is installed, and the barrier BA may extend upward from the periphery of the area where the controller 310 for the input interface 300 is installed.

Specifically, the barrier BA may be made of, for example, metal, and may prevent heat generated due to the driving of peripheral components from being introduced into the controller 310 for the input interface 300 and the input interface 300.

In some implementations, a silicone rubber may be inserted between an upper end of the barrier BA and a lower surface of the top plate 115.

A mica sheet MS may be provided between the lower plate LPA and the inverter substrate IV_PCB to insulate the lower plate LPA and the inverter substrate IV_PCB, of the case 125.

Specifically, one surface of the mica sheet MS may be attached to the lower plate LPA through a sealant, and the other surface of the mica sheet MS may contact a heat sink (e.g., a heat sink that radiates the heat for the inverter described below) provided on the inverter substrate IV_PCB.

Further, the first blowing fan 240 and the second blowing fan 250 may be installed on the lower plate LPA of the case 125.

Specifically, the first blowing fan 240 may be installed on the lower plate LPA, and may suction outside air through the inlet provided in the lower plate LPA to discharge the air to the inverter substrate IV_PCB.

More specifically, the air may be discharged from the first blowing fan 240 to the inverter substrate IV_PCB and may be guided rearward through the inverter substrate IV_PCB. The air guided rearward may be discharged below the lower plate LPA (i.e., the outside of the case 125) through the exhaust slit provided on the lower plate LPA.

As described above, as heat generated by the inverter substrate IV_PCB is easily discharged below the lower plate LPA, it is possible to resolve the heating of the inverter substrate IV_PCB, in particular, the inverter. That is, a temperature of the inverter may be reduced due to the air discharged from the first blowing fan 240 to the inverter substrate IV_PCB.

In some implementations, the second blowing fan 250 may be installed on the lower plate LPA and may suction the outside air through the inlet provided in the lower plate LPA and may discharge the air to the resonance substrate R_PCB.

More specifically, the air may be discharged from the second blowing fan 250 to the resonance substrate R_PCB and may be guided rearward through the resonance substrate R_PCB. The air guided rearward may be discharged below the lower plate LPA (i.e., the outside of the case 125) through the exhaust slit provided in the lower plate LPA.

As described above, as the heat generated by the resonance substrate R_PCB is easily discharged below the lower plate LPA, it is possible to resolve the heating of the resonance substrate R_PCB, in particular, the resonance capacitor. That is, the temperature of the resonance capacitor may be reduced due to the air discharged from the second blowing fan 250 to the resonance substrate R_PCB.

The cover plate 119 may be coupled to an upper end of the case 125 (i.e., an upper end of the side plate SPA) to close an inside of the case 125, and an object may be disposed on the upper surface of the cover plate 119.

Specifically, the cover plate 119 may include a top plate 115 to place the object such as a cooking vessel, and the heat generated by the working coil WC may be transmitted to the object through the top plate 115.

The top plate 115 may be made of, for example, glass. Further, the input interface 300 may be flatly buried on the top plate 115 to receive input from a user and transmits the input to the controller 310 for the input interface 300, but is not limited thereto. For example, the input interface 300 may be installed at a position other than the top plate 115.

In some implementations, the input interface 300 includes a module that inputs a heating intensity or driving time of the induction heating device 100 desired by the user, and may be variously implemented with a physical button or a touch panel. Further, the input interface 300 may include, for example, a power button, a lock button, a power level control button (+,−), a timer control button (+,−), a charging mode button, and the like, and may display a specific image (e.g., an image of a heating zone, an image of a heating intensity, and the like).

Further, the input interface 300 may be placed in an oblique direction of the first indicator substrate 175a and the fifth indicator substrate 175e in FIG. 9 described below, at one side of the second indicator substrate (175b in FIG. 9), the other side of the sixth indicator substrate (175f in FIG.

Figure 9:
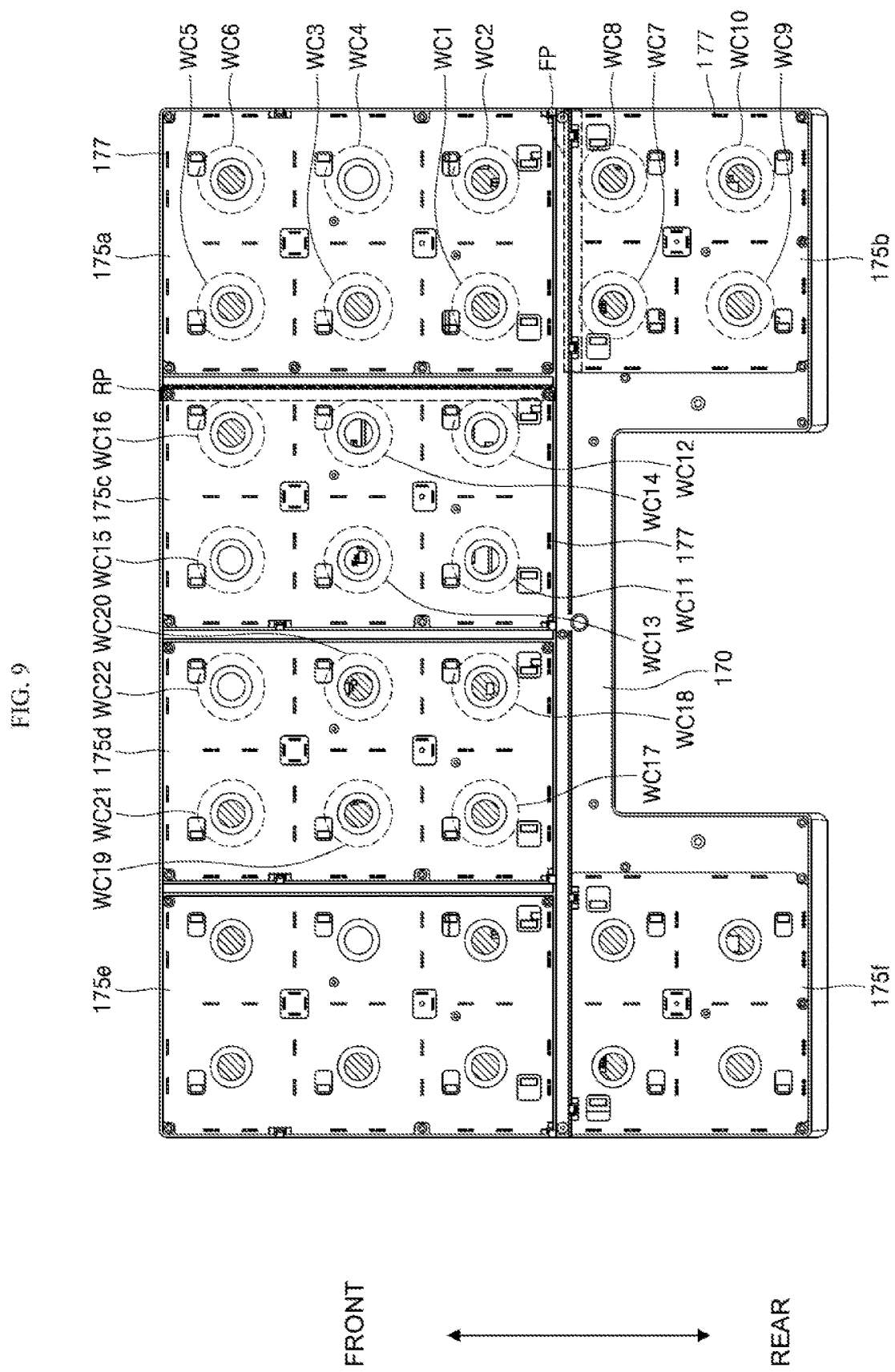
FIG. 9 is a plan view showing an example of an indicator substrate in FIG. 5.

9), and at a rear side of each of the third indicator substrate 175c and the fourth indicator substrate 175d in FIG. 9.

Further, the input interface 300 may transfer the input received from the user to the controller 310 for the input interface 300, and the controller 310 for the input interface 300 may transfer the input to the above-described controller (i.e., the controller for the inverter substrate). Details thereof are omitted.

In some implementations, the working coil assembly WCA may include a working coil WC, a ferrite core 126, and an additional mica sheet 120.

In some implementations, when the induction heating device 100 is a zone-free type induction heating device, a plurality of working coil assemblies WCAs may be present as shown in FIGS. 4 to 8, and a plurality of working coil assemblies (e.g., the WCAs) may be spaced apart from one another by a predetermined distance.

However, for convenience of description, one working coil assembly WCA is described.

Specifically, the working coil WC may include a conducting wire annularly wound with a plurality of times and may generate an alternating magnetic field. Further, the additional mica sheet 120 and the ferrite core 126 may be sequentially disposed below the working coil WC.

The ferrite core 126 may be disposed below the working coil WC, and a core hole may be defined at a central portion of the ferrite core 126 to vertically overlap with an annular inner side of the working coil WC.

Specifically, the base plate 145 may be disposed below the ferrite core 126, and the additional mica sheet 120 may be disposed between the ferrite core 126 and the working coil WC.

Further, as shown in FIGS. 7 and 8, a packing gasket 149 may be fastened to the core hole so that the ferrite core 126 may be fixed to the base plate 145, and a sensor 148 may be installed at an upper end of the packing gasket 140. In some implementations, the sensor 148 detects the temperature of the top plate 115, the temperature of the working coil WC, operation of the working coil WC, and the like, and the controller 310 for the input interface 300 may include temperature information or operation information.

Further, the ferrite core 126 may be fixed to the first mica sheet 120 through the sealant, and may function to diffuse an alternating magnetic field generated by the working coil WC.

The additional mica sheet 120 may be provided between the working coil WC and the ferrite core 126 and a sheet hole may be provided at a center of the additional mica sheet 120 to vertically overlap with the annular inner side of the working coil WC in the vertical direction.

Further, the base plate 145 may be integrated, for example, and may be made of aluminum (A), but is not limited thereto.

In some implementations, the indicator substrate 175 may be installed on the upper surface of the indicator substrate support 170 and may be spaced downward from the base plate 145. Accordingly, an air flow path described below may be provided between the base plate 145 and the indicator substrate 175. Details thereof are described below.

In some implementations, as shown in FIGS. 7 and 8, a connection hole 172 may be provided in the space between the ferrite cores on the base plate 145 to provide a space of the connector 171.

The connector 171 may protrude from the indicator substrate 175 to arrange wires and perform electrical connection of the working coils WCs. That is, the conductive wires of the working coils disposed around the connector 171 may be connected to the connector 171.

The third blowing fan 260 may be installed at one side of the lower surface of the base plate 145 and may suction the outside air (e.g., outside cool air) through the inlet slits IS_L and IS_S defined in the lower plate LPA and the side plate SPA of the case 125, and may discharge the air into the air flow path defined between the base plate 145 and the indicator substrate 175.

More specifically, as shown in FIG. 5, an upper fence HDF is provided on the upper surface of the indicator substrate support 170 and the upper fence HDF is provided along an edge of the upper surface of the indicator substrate support 170. The air flow path may be surrounded by the lower surface of the base plate 145, the upper surface of the indicator substrate 175, and the upper fence HDF.

Further, the base plate 145 may be integrated, and the air flow path may be surrounded by the lower surface of the base plate 145, the upper surface of the indicator substrate 175, and the upper fence HDF. The air may be discharged from the third blowing fan 260 to the air flow path and may be discharged to the outside of the case 125 through the additional exhaust slits DS_S. The air may be discharged by the third blowing fan 260 and may move along the air flow path, to reduce the temperature of the working coil WC and the temperature of the indicator (for example, a plurality of light emitting elements 177).

That is, as the cool air is circulated along the air flow path, the temperature of the working coil WC and the temperature of the indicator (in particular, the plurality of light emitting elements 177) may be reduced. Further, the heating of the working coil WC and the indicator (for example, the plurality of light emitting elements 177) generated due to radiation and a convection current may be resolved.

The light guide 210 may be installed on the base plate 145.

Specifically, the light guide 210 may be installed on the base plate 145 to be provided around the working coil WC. That is, four light guides (e.g., 210) per one working coil WC may be installed around the working coil WC (i.e., light guides are arranged on four surfaces of the outer portion of the working coil).

The light guide 210 may display whether the working coil WC is driven and output intensity of the working coil WC through a light emitting surface (e.g., an upper surface).

As shown in FIGS. 7 and 8, a light guide installation hole 147 to install the light guide 210 may be defined in the space between the ferrite cores, in the base plate 145. That is, the light guide installation hole 147 may be defined in the base plate 145 at the position in which the light guide 210 is installed. Accordingly, the light guide installation hole 147 may also be defined around the working coil WC, and four light guide installation holes 147 per one working coil WC may be defined around the working coil WC.

The light guide installation hole 147 may not overlap with a connection hole 172, and the number of the light guide installation holes 147 may be the same as the number of the light guides 210.

In some implementations, light emitted by the light emitting element 177 installed on the indicator substrate 175 may be transmitted to the light guide 210 through the light guide installation hole 147, and the light guide 210 may display the light emitted by the light emitting element 177 through the light emitting surface (e.g., the upper surface) provided at the upper end thereof.

The indicator substrate 175 may be installed on the upper surface of the indicator substrate support 170 to be spaced downward from the base plate 145, and a plurality of light emitting elements 177 may be installed on the upper surface of the indicator substrate 175.

The plurality of light emitting elements 177 may be, for example, light emitting diodes (LEDs), and the plurality of light emitting elements 177 may be symmetrical with respect to a center of the lower surface of the light guide 210, but is not limited thereto.

In some implementations, the indicator substrate 175 may have, for example, a form of a printed circuit board (PCB), and may drive a plurality of light emitting elements 177 based on the control signal received from the above-mentioned controller for the inverter substrate or the controller 310 for the input interface 300. Further, although not shown in the figures, various types of components may further be installed on the indicator substrate 175 to drive the plurality of light emitting elements 177.

Further, the indicator substrate 175 includes different types of substrates, and substrates are different from one another in terms of the arrangement structure of the light emitting element 177 and the method of fixing the indicator substrate, and details thereof are described below.

The indicator substrate support 170 may be coupled to the lower plate LPA to be disposed below the working coil WC.

Further, the above-described upper fence HDF may be provided on the upper surface of the indicator substrate support 170, and a lower fence LDF may be provided on the lower surface of the indicator substrate support 170.

That is, the upper fence HDF of the indicator substrate support 170 supports the lower surface of the base plate 145, and the lower fence LDF of the indicator substrate support 170 may be supported by the lower plate LPA.

Further, the indicator substrate 175 may be installed on the upper surface of the indicator substrate support 170 and the EMI filter 235, the SMPS 236, the resonance substrate R_PCB, and the inverter substrate IV_PCB may be installed on the lower surface of the indicator substrate support 170.

The EMI filter 235 may be installed on the lower surface of the indicator substrate support 170 and may receive the AC power from the above-described power supply. Further, the EMI filter 235 may reduce noise of the received AC power and provide the SMPS 236 with the AC power with reduced noise.

The SMPS 236 may be installed on the lower surface of the indicator substrate support 170, and may receive, from the EMI filter 235, the AC power with reduced noise. Further, the SMPS 236 may convert the received AC power into DC power and may provide the inverter substrate IV_PCB with the converted DC power.

The inverter substrate IV_PCB may be installed on the lower surface of the indicator substrate support 170 and may include the inverter that applies the resonance current to the working coil WC through the switching operation and a heat sink that radiates heat of the inverter.

The inverter may receive the DC power from the SMPS 236 and may apply a resonance current to the working coil WC by performing a switching operation based on the received DC power.

Further, a plurality of inverters may be provided, and the switching of the inverter may be controlled by the controller for the inverter substrate described above.

The inverter may include two switching elements, and the two switching elements may be alternately turned on and off based on a switching signal received from the controller for the inverter substrate. Further, high frequency alternating current (i.e., resonance current) may be generated through the switching of the two switching elements, and the generated high frequency alternating current may be applied to the working coil WC.

The resonance substrate R_PCB may be installed on the lower surface of the indicator substrate support 170, and may include a resonance capacitor connected to the working coil WC to resonate by the switching of the inverter and a heat sink that radiates the heat of the resonance capacitor.

The resonance capacitor resonates, when a resonance current is applied to the working coil WC by the switching operation of the inverter. Further, when the resonance capacitor resonates, an amount of a current flowing through the working coil WC connected to the resonance capacitor increases. That is, an eddy current may be induced into the object disposed above the working coil WC connected to the resonance capacitor through this process.

In some implementations, a plurality of resonance capacitors may be provided.

In some implementations, the induction heating device 100 may also perform a function for transmitting wireless power based on the above-mentioned configuration and feature.

That is, power is wirelessly supplied and is applied to a plurality of electronic devices. Electronic devices that use a technology for transmitting wireless power are charged by simply placing the electronic devices on a charging pad without connecting the electronic device to an additional charge connector. The electronic devices that transmit the wireless power may not require a wired cord or a charger, thereby improving portability of the electronic devices and reducing a size and a weight of the electronic devices.

The technology for transmitting the wireless power may use an electromagnetic induction method using a coil, a resonance method using resonance, and a radio wave radiation method in which electrical energy is converted into a microwave and the converted microwave is transmitted. The electromagnetic induction method uses electromagnetic induction between a primary coil (e.g., a working coil WC) provided in a device that transmits wireless power and a secondary coil provided in a device that receives wireless power to transmit the power.

The induction heating method of the induction heating device 100 substantially has the same principle as the technology for transmitting the wireless power using electromagnetic induction in that the object is heated by electromagnetic induction.

In some implementations, the induction heating device 100 may perform a function for transmitting the wireless power, as well as performing a function of induction heating. Further, an induction heating mode or a wireless power transmission mode may be controlled by the controller for the input substrate (or the controller 310 for the input interface 300). Thus, the function for inductively heating the object or the function for transmitting the wireless power may be selectively performed as necessary.

The induction heating device 100 may include one or more of the above-described configuration and features. Some components of the induction heating device 100 shown in FIG. 4 (e.g., an indicator substrate 175, a light emitting element 177, an indicator substrate support 170, and the like) are described below in more detail.

Figure 10:
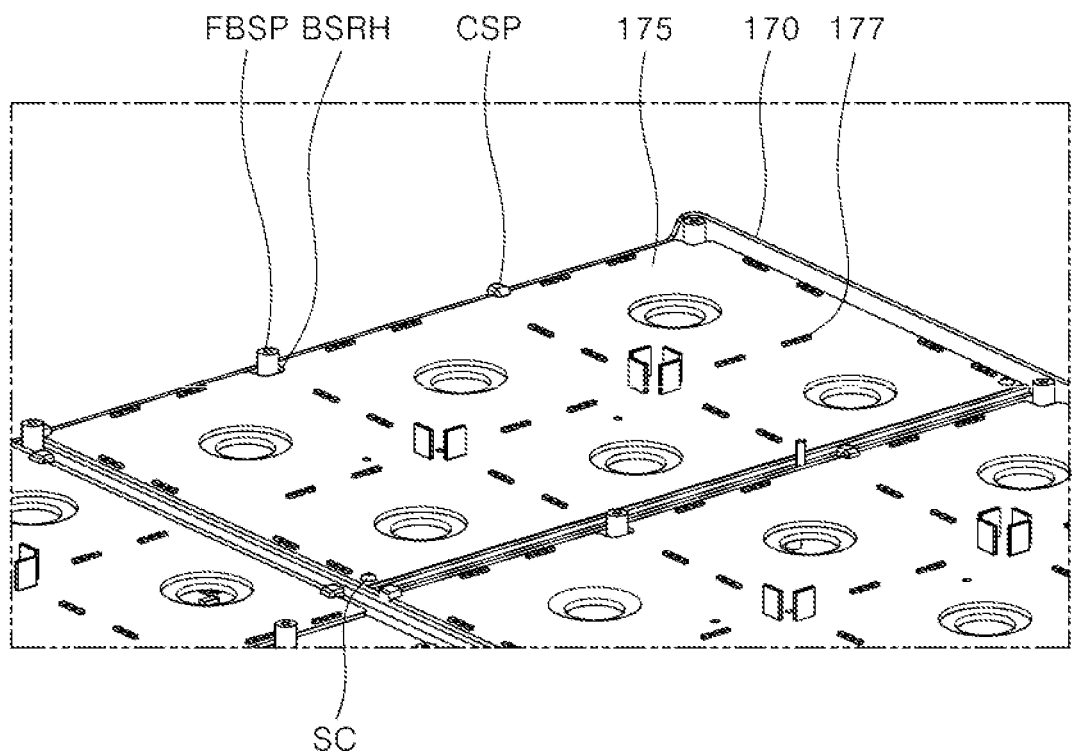
FIG. 10 is a perspective view showing example components shown in FIG. 9.
Figure 11:
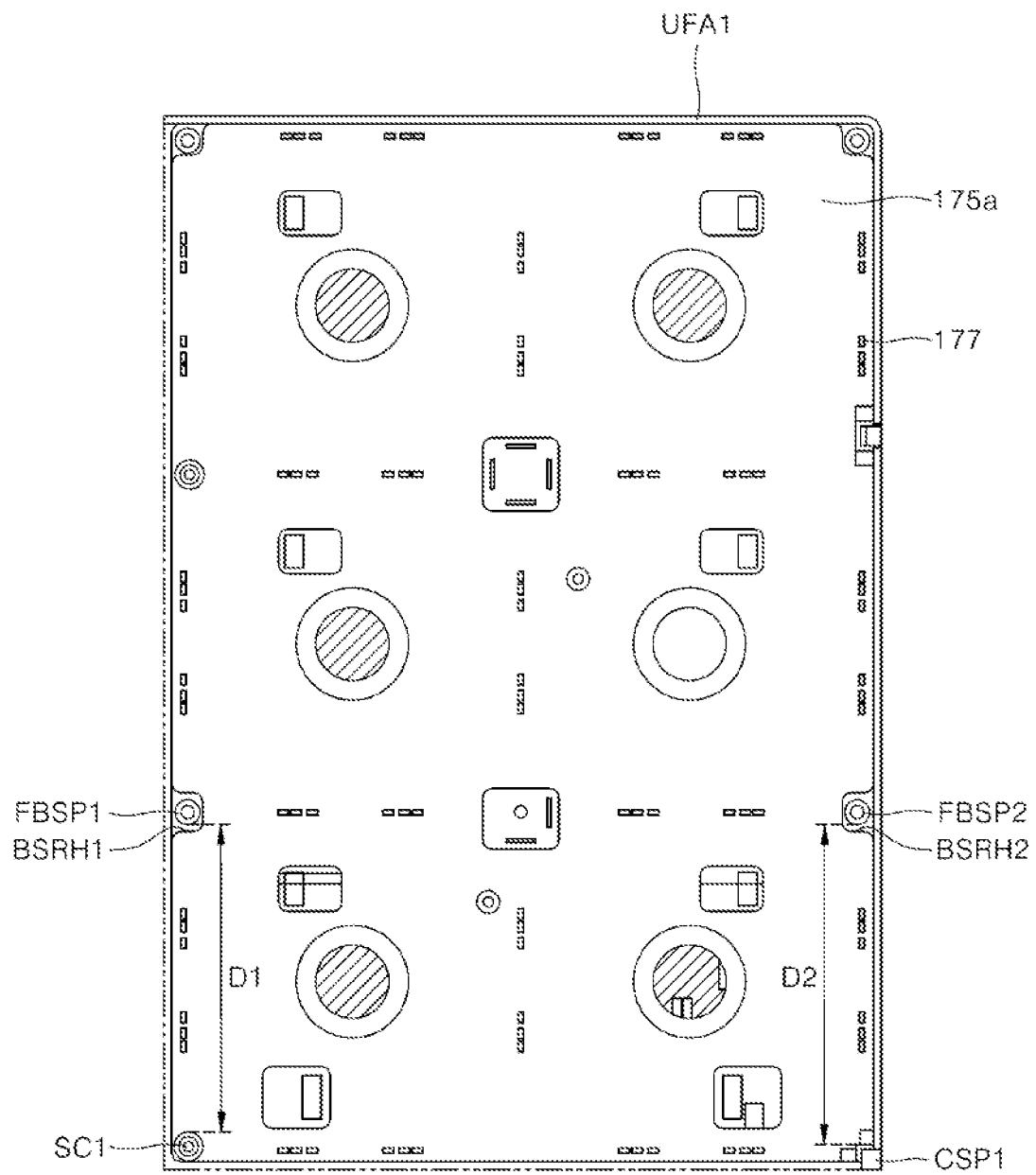
FIG. 11 is a plan view showing an example of a first indicator substrate and a first upper surface area shown in FIG. 9.
Figure 12:
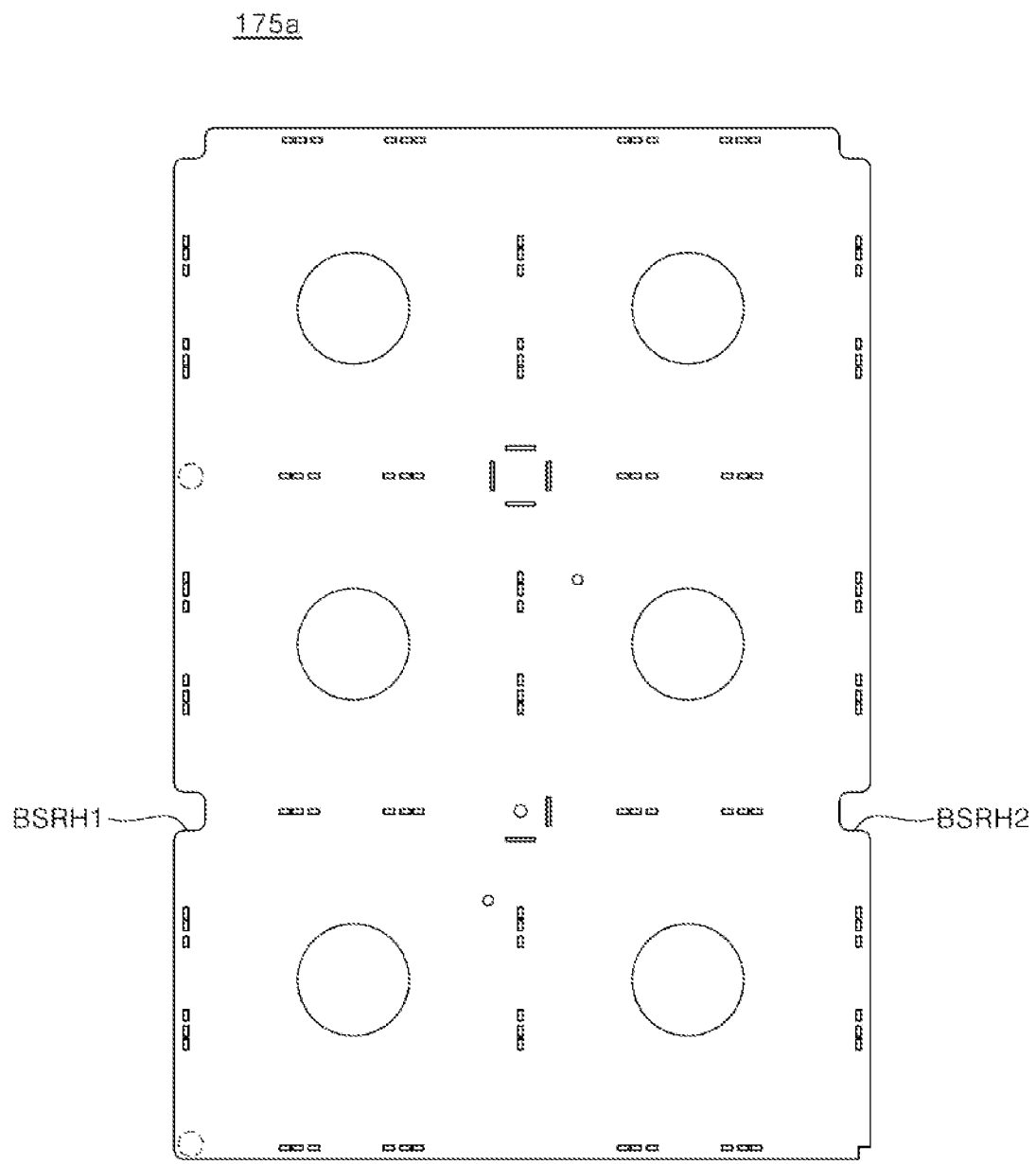
FIG. 12 is a plan view showing an example of the first indicator substrate shown in FIG. 11.
Figure 13:
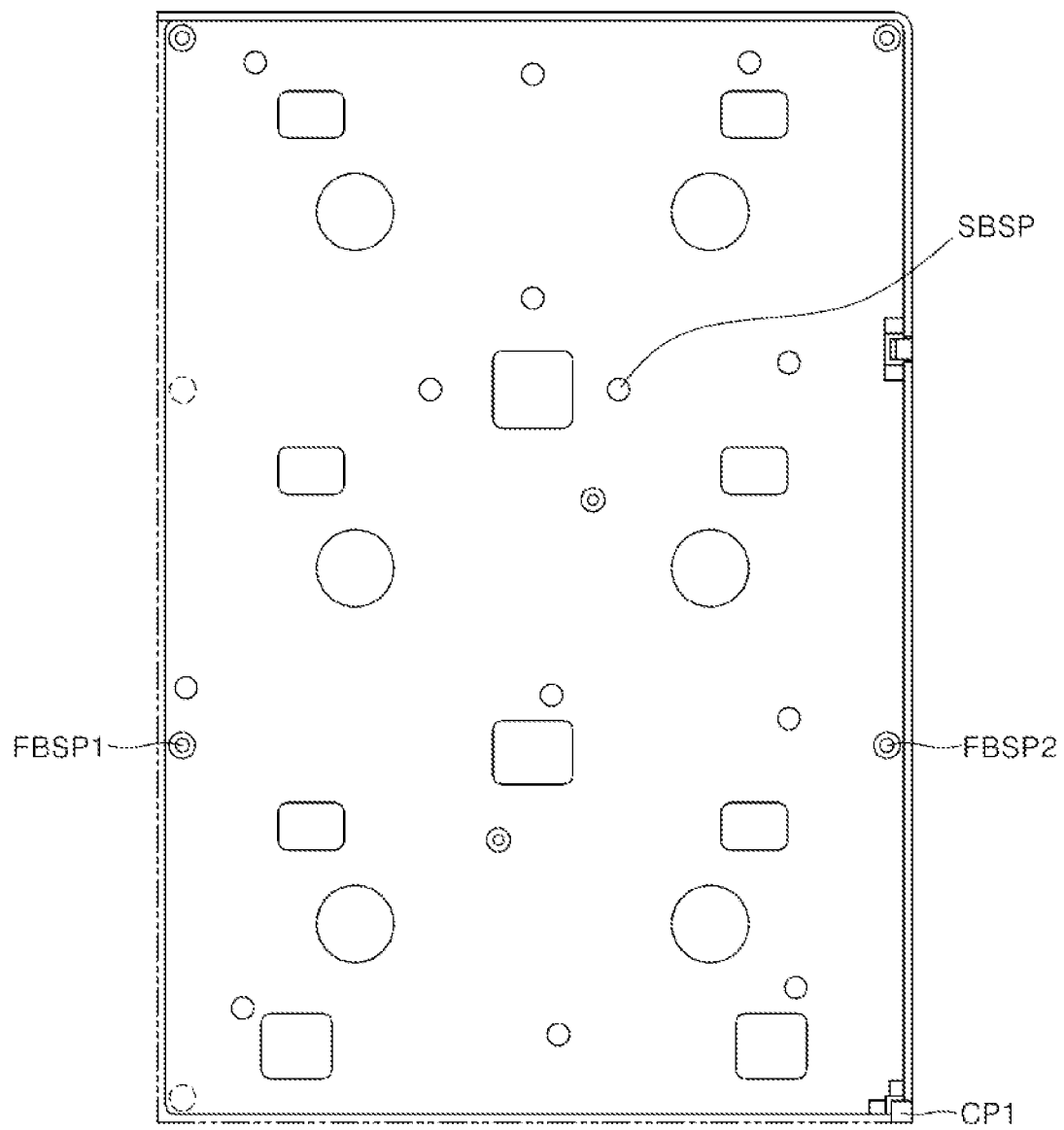
FIG. 13 is a plan view showing the first upper surface area shown in FIG. 11.
Figure 14:
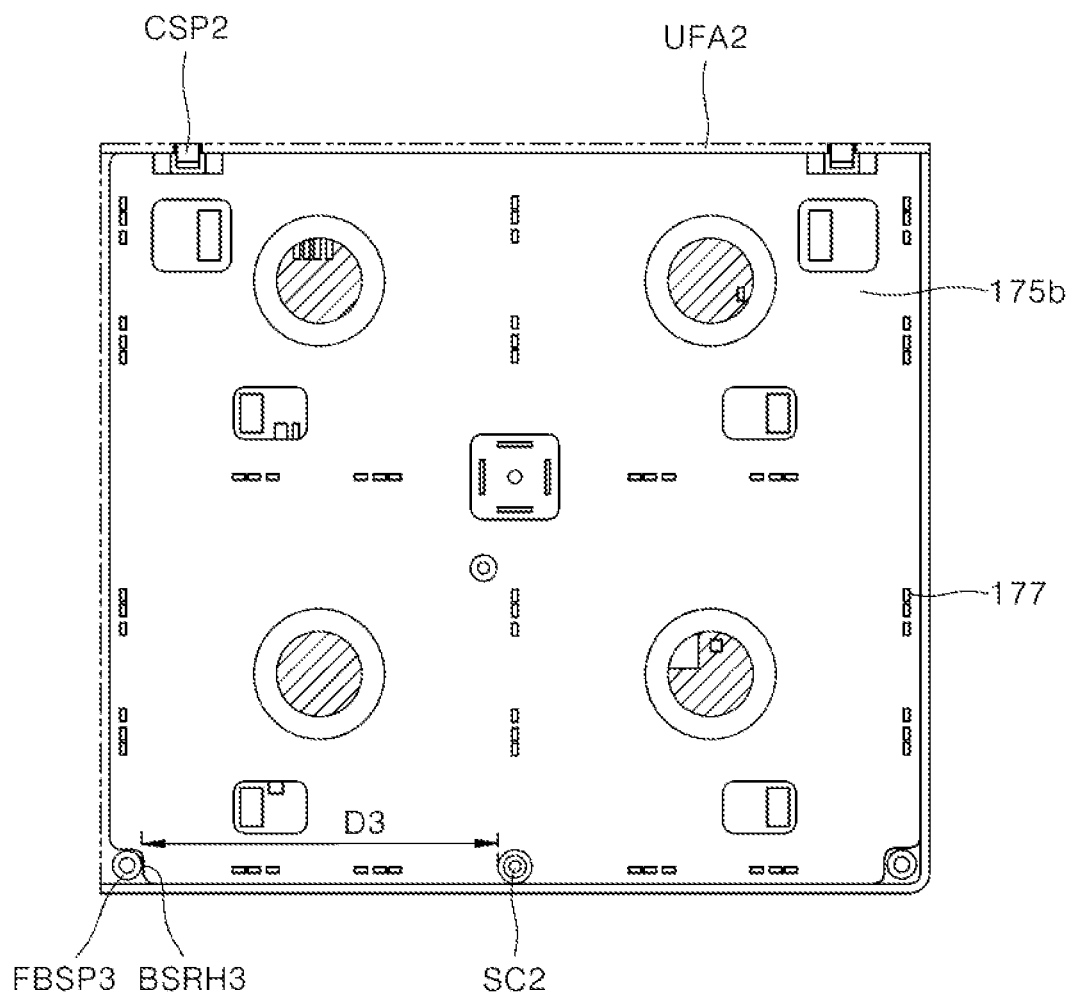
FIG. 14 is a plan view showing an example of a second indicator substrate and a second upper surface area shown in FIG. 9.
Figure 15:
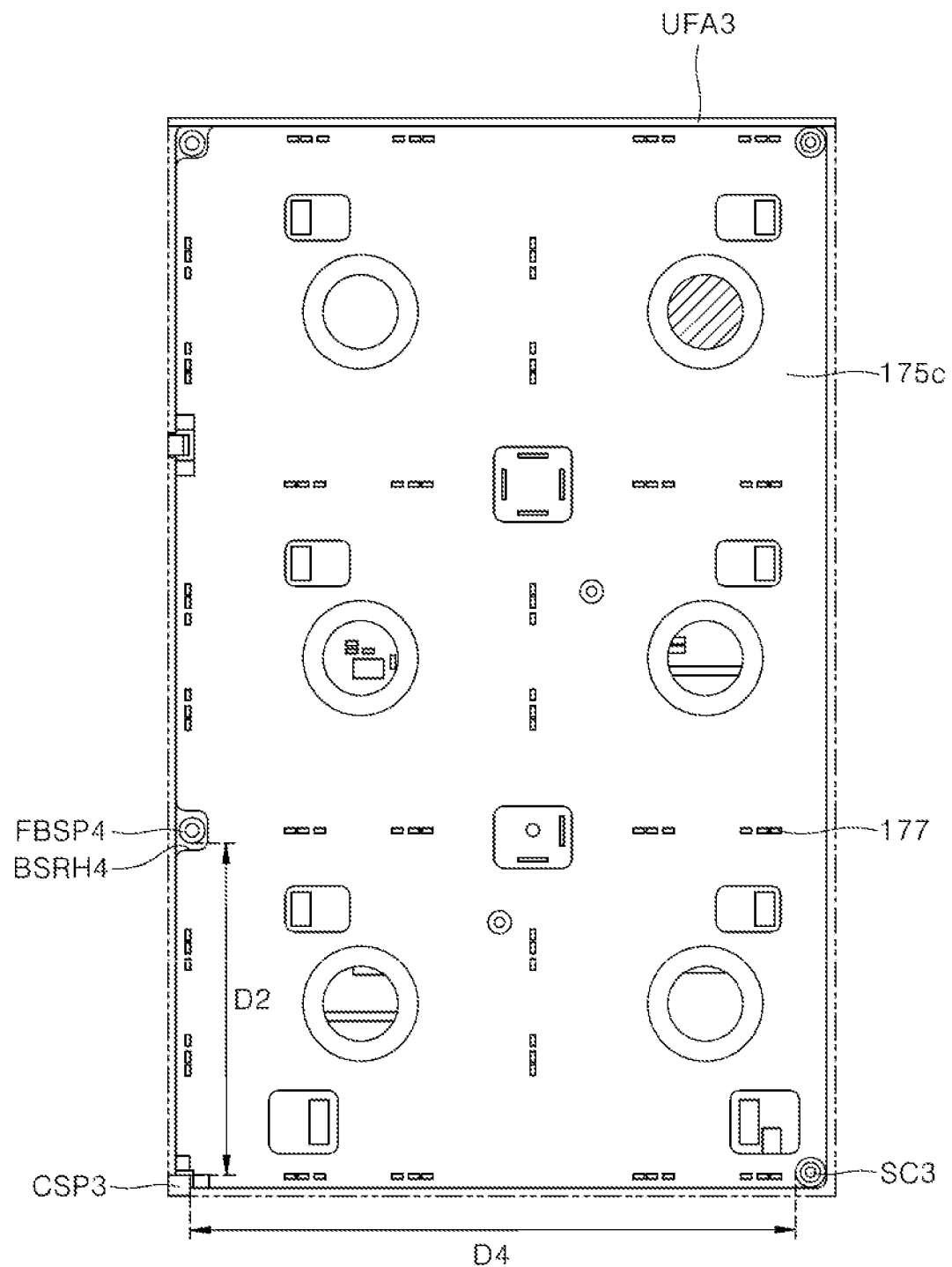
FIG. 15 is a plan view showing an example of a third indicator substrate and a third upper surface area shown in FIG. 9.

FIG. 9 is a plan view of the indicator substrate shown in FIG. 5. FIG. 10 is a perspective view showing some example components of FIG. 9. FIG. 11 is a plan view showing an example of a first indicator substrate and a first upper surface area shown in FIG. 9. FIG. 12 is a plan view of the first indicator substrate shown in FIG. 11. FIG. 13 is a plan view showing the first upper surface area shown in FIG. 11. FIG. 14 is a plan view showing an example of a second indicator substrate and a second upper surface area shown in FIG. 9. FIG. 15 is a plan view showing an example of a third indicator substrate and a third upper surface area shown in FIG. 9.

In some implementations, referring to FIG. 9, an indicator substrate 175 may include three types of indicator substrates.

A first type of indicator substrate is a first indicator substrate 175a, a second type of indicator substrate is a second indicator substrate 175b and a sixth indicator substrate 175f, and a third type of indicator substrate is a third indicator substrate 175c to a fifth indicator substrate 175e.

In some implementations, the sixth indicator substrate 175f has the same features and configurations except for an installation position of the second indicator substrate 175b. For example, the second indicator substrate 175b described as examples of the second type of indicator substrate is described. Further, a fourth indicator substrate 175d and a fifth indicator substrate 175e have the same features and configurations except for an installation position of the third indicator substrate 175c. For example, the third indicator substrate 175c described as examples of a third type indicator substrate is described.

In some examples, a first working coil portion, which includes a first working coil WC1 to a sixth working coil WC6, may be disposed above the first indicator substrate 175a. The first working coil portion may be disposed on the base plate 145 in FIG. 4 disposed above the first indicator substrate 175a.

Further, the light emitting element 177 may be installed at all outer portions of the first indicator substrate 175a and may be disposed at a front side of the second indicator substrate 175b and at the other side of the third indicator substrate 175c.

Accordingly, as shown in FIG. 9, light emitting elements 177 may be installed at a portion that vertically (i.e., a direction orthogonal to a flat surface of the indicator substrate 175) overlaps with not only all outer portions of the first indicator substrate 175a but also four surfaces of the outer portions of the first working coil WC1 to the sixth working coil WC6 in the first indicator substrate 175a.

The second working coil portion (i.e., a seventh working coil WC7 to a tenth working coil WC10) may be disposed above the second indicator substrate 175b. The second working coil portion is disposed on the base plate 145 in FIG. 4 placed above the second indicator substrate 175b.

Further, the light emitting element is not installed at the front outer portion FP of the second indicator substrate 175b adjacent to the first indicator substrate 175a, and the light emitting element 177 may be installed in the remaining outer portions of the second indicator substrate 175b. Further, the second indicator substrate 175b may be installed at a rear side of the first indicator substrate 175a.

The front outer portion FP of the second indicator substrate 175b may vertically overlap with the front end of the second working coil portion (in particular, the seventh working coil WC7 and the eighth working coil WC8).

Accordingly, as shown in FIG. 9, the light emitting elements 177 may be installed at a portion that vertically overlaps with the remaining outer portions of the second indicator substrate 175b except for the front outer portion FP and the remaining portion except for front ends of the seventh working coil WC7 and the eighth working coil WC8, among four surfaces of the outer portion of the seventh working coil WC7 to the 10 h working coil WC10 provided above the second indicator substrate 175b.

In some implementations, the sixth indicator substrate 175f, which belongs to the same type of indicator substrate together with the second indicator substrate 175b may be installed at a rear side of the fifth indicator substrate 175e described below. Further, the light emitting element may be disposed on the sixth indicator substrate 175f in the same manner as the second indicator substrate 175b.

A third working coil portion (e.g., the 11th working coil WC11 to the 16th working coil WC16) may be disposed above the third indicator substrate 175c. The third working coil is disposed on the base plate 145 in FIG. 4 placed above the third indicator substrate 175c.

Further, the light emitting element is not installed at the outer portion of the other side RP of the third indicator substrate 175c adjacent to the first indicator substrate 175a, and the light emitting element 177 may be installed at the remaining outer portion of the third indicator substrate 175c. The third indicator substrate 175c may be installed at one side of the first indicator substrate 175a.

The other outer portion RP of the third indicator substrate 175c may vertically overlap with the other side of the third working coil portion (in particular, a 12th working coil WC12, a 14th working coil WC14, and a 16th working coil WC16).

Accordingly, as shown in FIG. 9, the light emitting elements 177 may be installed at a portion that vertically overlaps with the remaining outer portions except for the outer portion at the other side RP1 of the third indicator substrate 175c and the remaining portion except for the other sides of the 12th working coil WC12, the 14th working coil WC14, and the 16th working coil WC16 among four surfaces of the outer portions of the 11th working coil WC11 to the 16th working coil WC16 provided above the third indicator substrate 175c.

In some implementations, the fourth indicator substrate 175d and the third indicator substrate 175c belong to the same type of indicator substrate. The fourth indicator substrate 175d may be installed at one side of the third indicator substrate 175c and the fifth indicator substrate 175e may be installed at one side of the fourth indicator substrate 175d and at a front side of the sixth indicator substrate 175f. Further, the light emitting elements may be installed on the fourth indicator substrate 175d and the fifth indicator substrate 173 in the same manner as the third indicator substrate 175c.

Further, a fourth working coil portion (e.g., the 17th working coil WC17 to a 22nd working coils WC22) may be disposed above the fourth indicator substrate 175d. Further, although not shown in the figures, a working coil portion having the same configuration as that of the fourth working coil may be disposed above the fifth indicator substrate 175e, and the working coil portion having the same configuration as the second working coil may be disposed above the sixth indicator substrate 175f. However, for convenience of description, details of the above configuration are omitted.

In some implementations, the induction heating device 100 may include the above three types of indicator substrates.

In other implementations, the induction heating device 100 may include a different type of indicator substrate from the three types of indicator substrates described above.

For example, when the light emitting element is not installed at outer portion at one side of the first indicator substrate 175a, the third indicator substrate 175c and the fourth indicator substrate 175d may be changed to the same type of indicator substrate as the first indicator substrate 175a. Further, the fifth indicator substrate 175e may be changed to the same indicator substrate as the third indicator substrate 175c (i.e., light emitting elements are installed at all outer portions).

In some implementations, the indicator substrate may be changed into various types of indicator substrate, where the number of rows of working coils provided in the working coil portion, and the like may be different from the number of rows shown in the figures. However, for convenience of description, in the implementation of the present disclosure, the above-described three types of indicator substrate are described.

FIG. 10 shows components that fix the indicator substrate 175 to the indicator substrate support 170.

Specifically, the component may include a fixing boss FBSP that protrudes upward from an upper surface of the indicator substrate support 170, and an interference fitting portion CSP provided on the upper surface of the indicator substrate support 170 to fix the indicator substrate 175, and a screw SC fastened to the upper surface of the indicator substrate support 170 through the indicator substrate 175.

Further, a boss avoiding groove BSRH may be provided in the indicator substrate 175 and may vertically overlap with the fixing boss FBSP to surround at least a portion of the fixing boss FBSP. That is, the boss avoiding groove BSRH is provided in the indicator substrate 175 for the fixing boss FBSP that protrudes upward from the upper surface of the indicator substrate support 170.

In some implementations, when the indicator substrate 175 is fixed to the indicator substrate support 170 through screws, a period of time for which components are assembled may be increased due to a period of time for which the screw is fastened, and a possibility that substrates move may be increased due to the fastening of the screw.

In some examples, the screw may be used only for a portion of the side of the indicator substrate 175, and at least one of boss structure (e.g., the fixing boss FSP and the boss avoiding groove BSRH) and the interference fitting portion CSP may be used for the remaining portion of the side surface of the indicator substrate 75, thereby reducing an assembly time and prevent substrates from moving.

However, a method of using the boss structure, the interference fitting portion CSP, and the screw SC may vary depending on types of indicator substrate 175. The method of using the components is described below according to types of indicator substrate 175.

FIGS. 11 to 13 show an example of a first type of indicator substrate (i.e., the first indicator substrate 175a) and a first upper surface area UFA1.

Specifically, the first indicator substrate 175a may be provided in the first upper surface area UFA1 of the upper surface of the indicator substrate support 170 in FIG. 9.

More specifically, a first fixing boss FBSP1 is provided at outer portion of one side of the first upper surface area UFA1 to protrude upward, and a first boss avoiding groove BSRH1 may be provided at the outer portion of one side of the first indicator substrate 175a, and may overlap with the first fixing boss FBSP1 to surround at least a portion of the first fixing boss FBSP1.

Further, a second fixing boss FBSP2 is provided at the outer portion of the other side of the first upper surface area UFA1 to protrude upward, and a second boss avoiding groove BSRH2 may be provided at the outer portion of the other side of the first indicator substrate 175a, and may vertically overlap with the second fixing boss FBSP2 to surround at least a portion of the second fixing boss FBSP2.

A first screw SC1 may be provided in the first upper surface area UFA1 and may be spaced rearward apart from the fist fixing boss FBSP1 by a first distance D1 and the first screw SC1 may be fastened to the first upper surface area UFA1 through the first indicator substrate 175a.

Further, a first interference fitting portion CSP1 may be provided in the first upper surface area UFA1 and may be spaced rearward apart from the second fixing boss FBSP2 by a first distance D1 to fix the first indicator substrate 175a.

As shown in FIG. 13, a plurality of supporting bosses (e.g., SBSPs) may protrude upward from an upper surface (i.e., the first upper surface area UFA1) of the indicator substrate support 170. Such a plurality of supporting bosses (e.g., SBSPs) may support the first indicator substrate (i.e., 175a in FIG. 12) upward.

As described above, the above-described components may be provided onto the first indicator substrate 175a and the first upper surface area UFA1, thereby reducing the assembly time and preventing substrates from moving. Further, a plurality of supporting bosses (e.g., SBSPs) may support the first indicator substrate 175a upward, so that the first indicator substrate 175a may be stably provided in the first upper surface area UFA1.

In some implementations, as shown in FIG. 11, the above-mentioned first fixing boss FBSP1 and second fixing boss FBSP2, and the first boss avoiding groove BSRH1 and a second boss avoiding groove BSRH2, a first screw SC1, and a first interference fitting portion CSP1 may be provided in pairs, respectively, on the first indicator substrate 175a and the first upper surface area UFA1. Further, the remaining components may be disposed and used, through the same method of disposing and using the above-mentioned components. Details of the above configuration are omitted.

FIG. 14 shows an example of a second type of indicator substrate (i.e., the second indicator substrate 175b) and a second upper surface area UFA2.

Specifically, the second indicator substrate 175b may be installed in the second upper surface area UFA2 of the upper surface of the indicator substrate support 170.

More specifically, a second interference fitting portion CSP2 may be provided at the front outer portion of the second upper surface area UFA2 to fix the second indicator substrate 175b.

Further, a third fixing boss FBSP3 is provided at an outer portion of the rear end of the second upper surface area UFA2 to protrude upward, and a third fixing avoiding boss BSRH3 may be provided at a portion, of the outer portion of the rear end of the second indicator substrate 175b, that vertically overlaps with the third fixing boss FBSP3 and may surround at least a portion of the third fixing boss FBSP3.

The second screw SC2 may be provided in the second upper surface area UFA2 and may be spaced apart from the third fixing boss FBSP3 toward the other side thereof and may be fastened to the second upper surface area UFA2 through the second indicator substrate 175b.

Further, although not shown in the figures, a plurality of supporting bosses may protrude upward from the upper surface of the indicator substrate support 170 (i.e., the second upper surface area UFA2). The plurality of supporting bosses may support the second indicator substrate 175b upward.

The above-described components may be used for the second indicator substrate 175b and the second upper surface area UFA2 to reduce assembly time and prevent substrates from moving. Further, the plurality of supporting bosses may support the second indicator substrate 175*b* upward, so that the second indicator substrate 175*b* may be stably provided in the second upper surface area UFA2.

In some implementations, as shown in FIG. 14, the third fixing boss FBSP3, the third boss avoiding groove BSRH3, and the second indicator interference fitting portion CSP2 may be provided in pairs (in some implementations, the second screw SC2 may be a single component). Further, the remaining components may be arranged and used in the same manner as the method of arranging and using the above-described components, and thus, details thereof are omitted.

Finally, FIG. 15 shows a third type of indicator substrate (e.g., the third indicator substrate 175*c*) and the third upper surface area UFA3.

Specifically, the third indicator substrate 175*c* may be provided in the third upper surface area UFA3 of the upper surface of the indicator substrate support 170.

More specifically, a fourth fixing boss FBSP4 is provided at outer portion at one side of the third upper surface area UFA3 to protrude upward, and a fourth boss avoiding groove BSRH4 may be provided at an outer portion of one side of the third indicator substrate 175*c* and may vertically overlap with the fourth fixing boss FBSP4 and may surround at least a portion of the fourth fixing boss FBSP4.

Further, a third interference fitting portion CSP3 may be provided in the third upper surface area UFA3 and may be spaced rearward apart from the fourth fixing boss FBSP4 by a second distance D2 to fix the third indicator substrate 175*c* to the third upper surface area UFA3. A third screw SC3 may be provided in the third upper surface area UFA3 and may be spaced apart from the third interference fitting portion CSP3 toward the other side thereof by a fourth distance D4 and may be fastened to the third upper surface area UFA3 through the third indicator substrate 175*c*.

Although not illustrated in the figures, a plurality of supporting bosses may protrude upward from the upper surface of the indicator substrate support 170 (i.e., the third upper surface area UFA3). The plurality of supporting bosses may support the third indicator substrate 175*c* upward.

The above-described components may be used for the third indicator substrate 175*c* and the third upper surface area UFA3, thereby reducing assembly time and preventing substrates from moving. Further, the plurality of supporting bosses may support the third indicator substrate 175*c* upward, so that the third indicator substrate 175*c* may be stably seated on the third upper surface area UFA3.

In some implementations, as shown in FIG. 15, the above-mentioned fourth fixing boss FBSP4, a fourth boss avoiding groove BSRH4, and a third interference fitting portion CSP3, and a third screw SC3 may be provided in pairs on the third indicator substrate 175*c* and the third upper surface area UFA3. Further, the remaining components may be arranged and used in the same manner as the method of arranging and using the above-mentioned components. Details thereof are omitted.

The induction heating device 100 may have an improved arrangement of the light emitting elements in which the light emitting elements may be provided onto the four surfaces at the outer portion of the working coil at predetermined distances, and unnecessary light emitting elements may be reduced. Further, material cost may be reduced and the space may be provided by reducing the unnecessary light emitting elements, thereby improving ease of manufacturing of indicator substrates and increasing strength of the indicator substrate support.

Further, in the induction heating device 100 according to the implementation of the present disclosure, the structure to fix the indicator substrate is improved, so that the number of screws required to fix the indicator substrate may be reduced. Further, the number of screws may be reduced, thereby reducing a time taken to fasten the screw and improving assembly.

While the present disclosure has been described with reference to exemplary drawings thereof, it is to be understood that the present disclosure is not limited to implementations and drawings in the present disclosure, and various changes can be made by the skilled person in the art within the scope of the technical idea of the present disclosure. Although working effects obtained based on configurations of the present disclosure are not explicitly described while describing the implementations of the present disclosure, effects predictable based on the configurations have also to be recognized.

What is claimed is:

1. An induction heating device, comprising:
a case;
a plurality of working coils located inside the case and configured to heat one or more objects;
a base plate that supports the plurality of working coils;
a plurality of light guides that are installed on the base plate and that define four surfaces that cover outer portions of each of the plurality of working coils;
a plurality of light emitting elements disposed vertically below the plurality of light guides, respectively, and configured to emit light; and
an indicator substrate that is disposed vertically below the base plate and that seats the plurality of light emitting elements, the indicator substrate comprising:
a first indicator substrate, a first portion of the plurality of light emitting elements being arranged along outer portions of the first indicator substrate, and
a second indicator substrate disposed at a rear side of the first indicator substrate, a second portion of the plurality of light emitting elements being arranged along outer portions of the second indicator substrate except for an outer portion at a front side that is adjacent to and faces the rear side of the first indicator substrate.

2. The induction heating device of claim 1, wherein the plurality of working coils comprise:
a first working coil portion comprising first two or more working coils that are connected to each other and disposed vertically above the first indicator substrate; and
a second working coil portion comprising second two or more working coils that are connected to each other and disposed vertically above the second indicator substrate, and
wherein the second working coil portion is disposed at a rear side of the first working coil portion.

3. The induction heating device of claim 2, wherein the outer portion at the front side of the second indicator substrate vertically overlaps with a front end of the second working coil portion.

4. The induction heating device of claim 2, wherein the first portion of the plurality of light emitting elements are installed at a portion of the first indicator substrate that vertically overlaps with four surfaces of the outer portions of the first indicator substrate around the first two or more working coils, and
wherein the second portion of the plurality of light emitting elements are installed at a portion of the second indicator substrate that vertically overlaps with three surfaces among four surfaces of the outer portions of the second indicator substrate around the second two or more working coils except for a front end of the second working coil portion.

5. The induction heating device of claim 2, wherein the indicator substrate further comprises:
a third indicator substrate installed at a lateral side of the first indicator substrate, a third portion of the plurality of light emitting elements being arranged along outer portions of the third indicator substrate except for an outer portion that is adjacent to and faces the first indicator substrate; and
a fourth indicator substrate installed at a lateral side of the third indicator substrate, a fourth portion of the plurality of light emitting elements being arranged along outer portions of the fourth indicator substrate except for an outer portion that is adjacent to and faces the third indicator substrate, and
wherein the plurality of working coils further comprise:
a third working coil portion comprising third two or more working coils that are connected to each other, that are disposed side by side, and that are disposed vertically above the third indicator substrate, wherein one of the third two or more working coils faces at a lateral side of one of the first two or more working coils, and
a fourth working coil portion comprising fourth two or more working coils that are connected to each other, that are disposed side by side, and that are disposed vertically above the fourth indicator substrate, wherein one of the fourth two or more working coils faces a lateral side of one of the third two or more working coils.

6. The induction heating device of claim 5, wherein the outer portion of the third indicator substrate vertically overlaps with the one of the third two or more working coils, and
wherein the outer portion of the fourth indicator substrate vertically overlaps with the one of the fourth two or more working coils.

7. The induction heating device of claim 5, wherein the third portion of the plurality of light emitting elements are installed at a portion of the third indicator substrate that vertically overlaps with three sides among four sides around the third two or more working coils except for one side facing the lateral side of the one of the first two or more working coils, and
wherein the fourth portion of the plurality of light emitting elements are installed at a portion of the fourth indicator substrate that vertically overlaps with three sides among four sides around the fourth two or more working coils except for one side facing the lateral side of the one of the third two or more working coils.

8. The induction heating device of claim 5, wherein the first working coil portion further comprises four working coils arranged parallel to the first two or more working coils,
wherein the second working coil portion further comprises two working coils connected arranged parallel to the second two or more working coils,
wherein the third working coil portion further comprises four working coils arranged parallel to the third two or more working coils, and
wherein the fourth working coil portion further comprises four working coils arranged parallel to the fourth two or more working coils.

9. The induction heating device of claim 1, further comprising an indicator substrate support, an upper surface of the indicator substrate support defining a first upper surface area that supports the first indicator substrate and a second upper surface area that supports the second indicator substrate, and
wherein the indicator substrate further comprises a third indicator substrate installed on a third upper surface area of the upper surface of the indicator substrate support and disposed at one side of the first indicator substrate, a third portion of the plurality of light emitting elements being arranged along outer portions of the third indicator substrate except for an outer portion that is adjacent to and faces the first indicator substrate.

10. The induction heating device of claim 9, further comprising:
a first fixing boss that is disposed at a first outer portion of the first upper surface area and that protrudes upward of the first upper surface area, wherein the first indicator substrate defines a first boss groove that is disposed at a first side of the first indicator substrate, that vertically overlaps with the first fixing boss, that surrounds at least a portion of the first fixing boss;
a second fixing boss that is disposed at a second outer portion of the first upper surface area and that protrudes upward of the first upper surface area, wherein the first indicator substrate further defines a second boss groove that is disposed at a second side of the first indicator substrate, that vertically overlaps with the second fixing boss, and that surrounds at least a portion of the second fixing boss;
a first screw that is disposed in the first upper surface area, that is spaced apart from the first fixing boss by a first distance in a rearward direction, and that is fastened to the first upper surface area through the first indicator substrate; and
a first interference fitting portion that is disposed in the first upper surface area, that is spaced apart from the second fixing boss by a second distance in the rearward direction, and that is configured to fix the first indicator substrate to the first upper surface area.

11. The induction heating device of claim 10, further comprising:
a second interference fitting portion that is disposed at a front end of the second upper surface area and coupled to the second indicator substrate;
a third fixing boss that is disposed at a rear end of the second upper surface area and that protrudes upward of the second upper surface area, wherein the second indicator substrate defines a third boss groove that is disposed at a rear end of the second indicator substrate, that vertically overlaps with the third fixing boss, and that surrounds at least a portion of the third fixing boss; and
a second screw that is disposed in the second upper surface area, that is spaced apart from the third fixing boss by a third distance in a lateral direction, and that is fastened to the second upper surface area through the second indicator substrate.

12. The induction heating device of claim 11, further comprising:
a fourth fixing boss that is disposed at an outer portion of the third upper surface area and that protrudes upward of the third upper surface area, wherein the third indicator substrate defines a fourth boss groove that is disposed at an outer portion of the third indicator substrate, that vertically overlaps with the fourth fixing boss, and that surrounds at least a portion of the fourth fixing boss;

a third interference fitting portion that is disposed in the third upper surface area, that is spaced apart from the fourth fixing boss by a fourth distance in the rearward direction, and that is configured to fix the third indicator substrate to the third upper surface area; and a third screw that is disposed in the third upper surface area, that is spaced apart from the third interference fitting portion by a fifth distance in the lateral direction, and that is fastened to the third upper surface area through the third indicator substrate.

13. The induction heating device of claim 9, further comprising:

a plurality of supporting bosses that protrude upward of the upper surface of the indicator substrate support and that support each of the first indicator substrate, the second indicator substrate, and the third indicator substrate.

14. The induction heating device of claim 1, further comprising:

a cover plate that is coupled to an upper end of the case, the cover plate comprising a top plate configured to seat the one or more objects; and an input interface that is flush with the top plate and that is configured to display one or more images.

15. The induction heating device of claim 14, wherein the input interface is disposed at one side of the second indicator substrate in an oblique position with respect to the first indicator substrate.

16. The induction heating device of claim 1, wherein a number of the first portion of the plurality of working coils is greater than a number of the second portion of the plurality of working coils.

17. The induction heating device of claim 5, wherein a number of the first portion of the plurality of working coils is greater than a number of the second portion of the plurality of working coils, and wherein the number of the first portion of the plurality of working coils is equal to a number of the third portion of the plurality of working coils.

18. The induction heating device of claim 17, further comprising:

a cover plate that is coupled to an upper end of the case, the cover plate comprising a top plate configured to seat the one or more objects; and an input interface that is flush with the top plate and that is configured to display one or more images, wherein the input interface is located at an oblique position with respect to the first indicator substrate, and faces a lateral side of the second indicator substrate and a rear side of the third indicator substrate.

19. The induction heating device of claim 5, wherein the fourth indicator substrate is disposed at a position symmetrical to the third indicator substrate with respect to a lateral side of the third indicator substrate, and wherein the indicator substrate further comprises additional indicator substrates that are respectively disposed at positions symmetrical to the first indicator substrate and the second indicator substrate with respect to the lateral side of the third indicator substrate.

20. The induction heating device of claim 19, further comprising:

a cover plate that is coupled to an upper end of the case, the cover plate comprising a top plate configured to seat the one or more objects; and an input interface that is flush with the top plate and that is configured to display one or more images, wherein the input interface has three sides that are surround by the first indicator substrate, the second indicator substrate, the third indicator substrate, the fourth indicator substrate, and the additional indicator substrates.

* * * * *